Charles M. Young's Roller Attachment for Plows.

116388          PATENTED JUN 27 1871

Witnesses.
Fred Haynes
J. W. Coombs

Charles M. Young
per Omar Coombs
Attorney

UNITED STATES PATENT OFFICE.

CHARLES M. YOUNG, OF MEADVILLE, PENNSYLVANIA, ASSIGNOR TO HIMSELF AND CHARLES GABLE, OF SAME PLACE.

IMPROVEMENT IN ROLLER ATTACHMENTS FOR PLOWS.

Specification forming part of Letters Patent No. 116,388 dated June 27, 1871.

*To all whom it may concern:*

Be it known that I, CHARLES M. YOUNG, of Meadville, in the county of Crawford and State of Pennsylvania, have invented a new and useful Roller Attachment for Plows and Cultivators; and I do hereby declare that the following is a full, clear, and exact description thereof, reference being had to the accompanying drawing forming part of this specification.

The object of this invention is to afford facility for drawing back a plow when necessary, and for its transportation from one place or field to another. It consists in a roller so supported in a swinging frame or swinging bearings, which are hinged to the back part of the plow or cultivator, that it may either be allowed to drag behind without interfering with the ordinary operation, or may, by simply raising the handles of the plow to allow the roller to swing forward, and fastening a catch provided on the roller-bearings, be rigidly secured in position under the middle of the plow, which may then be wheeled or rolled to any desired place.

Figure 1:
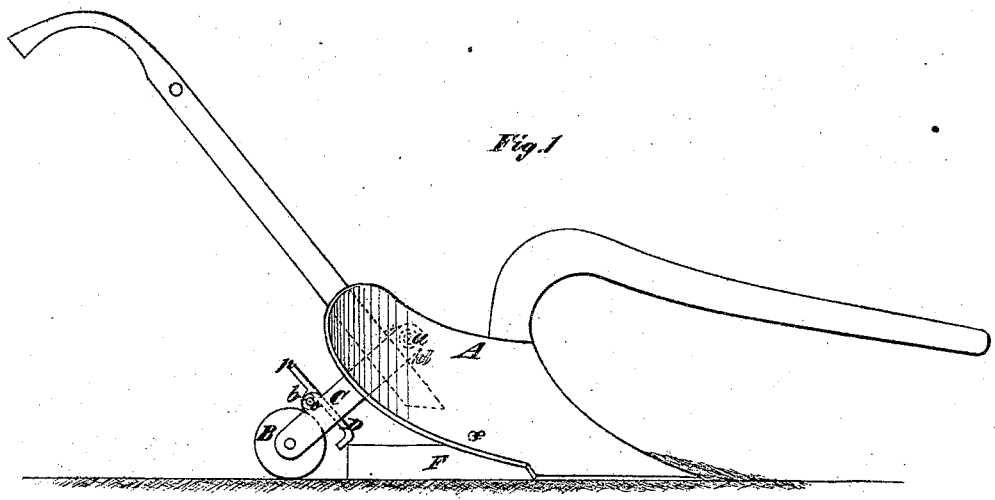
Figure 2:
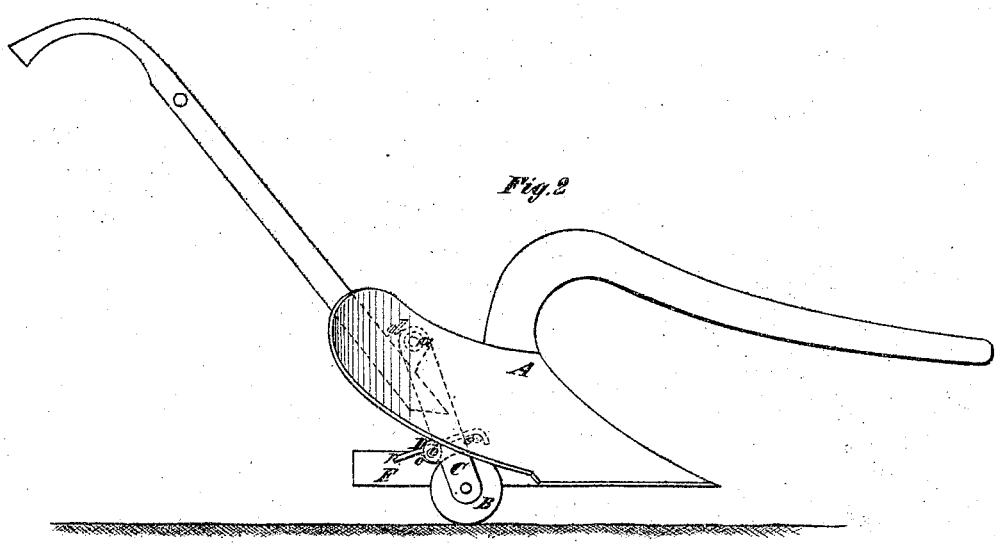
Figure 3:
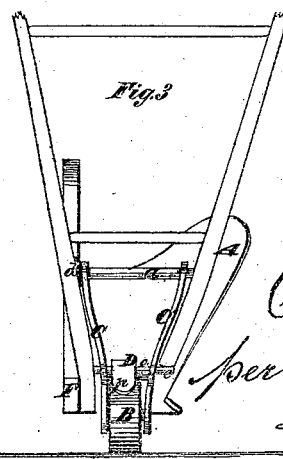

In the accompanying drawing, Figure 1 is a side elevation of a plow with my roller attachment applied, showing the latter in an inoperative position dragging behind the plow. Fig. 2 is a similar view, showing the roller fastened in position under the plow; and Fig. 3 is a back view of the plow with the roller in the same position.

Similar letters of reference indicate corresponding parts in all three figures.

B is the roller, which constitutes the principal feature of my invention, having its axle supported in a swinging frame, C C, which is pivoted to a horizontal transverse bar, $a$, one end of which is secured into the mold-board A of the plow, and the other into a plate, $d$, secured to the handle which is furthest from the mold-board. Just above the roller there is secured in the swinging frame C C a transverse pin, $b$, to which is pivoted a catch, D. This catch has its forward end bent over to form a hook, and has formed about the middle of its under side a boss, $c$, through which it is pivoted to the pin $b$. The rear end of this catch is extended to form a foot-piece, $p$. $e$ is a horizontal cross-bar, one end of which is secured into the mold-board A and the other into the land-side F, and over which the hook-like inner end of the catch is capable of being hooked to secure the roller in the position relatively to the several parts of the plow represented in Fig. 2.

During the operation of the plow the catch D remains unfastened and the roller drags behind, as shown in Fig. 1; but when, as sometimes happens in plowing, it is necessary to draw back the plow a short distance, the handles are raised high enough to allow the roller to swing forward, and, without fastening the catch, the plow may then be drawn or rolled back on the roller, and on starting the plow forward again it is in the right position to enter the ground, and when it has properly entered the roller is again left dragging in the rear.

To enable the plow to be easily removed any distance, as from one field to another, the roller is thrown forward and secured by the catch in the position shown in Fig. 2. This is done by raising the handles as before, allowing the roller to swing forward, and putting the foot on the rear end of the catch to raise the hook, and by then removing the foot to allow the front end of the catch to hook over the bar $e$. The handles are then forced down to throw the heft of the plow over the roller and keep the share out of contact with the ground, and in this position the plow may be rolled to any place. To unfasten the catch it is only necessary to press the foot-piece so as to detach the hook-like end of the catch from the brace $e$, and then allow the brace to drop back in the manner before described. When the roller is in the position described it is thrown so far forward of its center of suspension $a$ that very little strain is thrown on the catch; but most of it is exerted in a direct thrust on the brace to which the bearings C C are hinged.

What I claim as my invention, and desire to secure by Letters Patent, is—

1. The combination, with a plow or cultivator, of a roller, B, arranged in a frame, C, and applied and operating substantially as and for the purpose herein specified.

2. The combination, with the roller and its swinging frame, of a hooked catch, arranged substantially as herein described, to be operated by the feet of the plowman.

CHARLES M. YOUNG.

Witnesses:
T. N. CLARK,
C. S. HOWDON.